United States Patent [19]

Pearson

[11] Patent Number: 5,414,918

[45] Date of Patent: May 16, 1995

[54] PORTABLE FRAMING JIG

[75] Inventor: Robert J. Pearson, Hardy, Ark.

[73] Assignee: High Tech Housing Systems, Inc., Hardy, Ark.

[21] Appl. No.: 242,256

[22] Filed: May 13, 1994

Related U.S. Application Data

[63] Continuation-in-part of Ser. No. 930,369, Aug. 17, 1992, abandoned.

[51] Int. Cl.⁶ .......................... B23Q 7/00; B27F 7/00
[52] U.S. Cl. ...................................... 29/33 K; 29/56.6; 29/795; 227/152; 269/910
[58] Field of Search ............. 29/430, 795, 33 R, 33 P, 29/56.6, 33 K; 227/100, 101, 113, 152; 169/910

[56] References Cited

U.S. PATENT DOCUMENTS

| | | | |
|---|---|---|---|
| 3,699,622 | 10/1972 | Frydenberg | 29/795 |
| 3,711,007 | 1/1973 | Fry | 227/101 |
| 3,897,620 | 8/1975 | Wright | 29/430 |
| 4,039,112 | 8/1977 | Schultz | 227/100 X |
| 4,081,120 | 3/1978 | Epes | 227/113 |
| 4,148,471 | 4/1979 | Werner | 269/910 X |
| 4,154,436 | 5/1979 | Sellers | 269/910 X |
| 4,305,538 | 12/1981 | Schultz et al. | 29/430 X |
| 4,629,171 | 12/1986 | Judy et al. | 269/37 |
| 4,801,130 | 1/1989 | Montgomery | 269/37 |
| 4,876,787 | 10/1989 | Ditty | 29/430 |
| 4,998,336 | 3/1991 | Papsdorf | 29/432 |
| 5,058,795 | 10/1991 | Tonus | 227/152 |
| 5,092,028 | 3/1992 | Harnden | 29/709 |

Primary Examiner—William Briggs
Attorney, Agent, or Firm—Ray F. Cox

[57] ABSTRACT

A framing jig for building various configurations of wall sections, roof trusses and similar structural components in building construction. In one embodiment, two or more ganged cradle assemblies are provided with spaced cradles for supporting building studs in a spaced transverse configuration. Each set of ganged cradle assemblies may be set for a characteristic spacing distance. In an alternative embodiment, one set of ganged cradle assemblies is provided with means for extending alternate cradles so that staggered stud double walls may be constructed. By providing jig stops along transverse structural members, roof trusses may be constructed using the same framing jig on which building walls may be constructed. In a further embodiment, the framing jig may be deployed in a portable configuration combined with a sawing station and other supporting equipment for a fulling integrated on-sight fabrication facility.

11 Claims, 15 Drawing Sheets

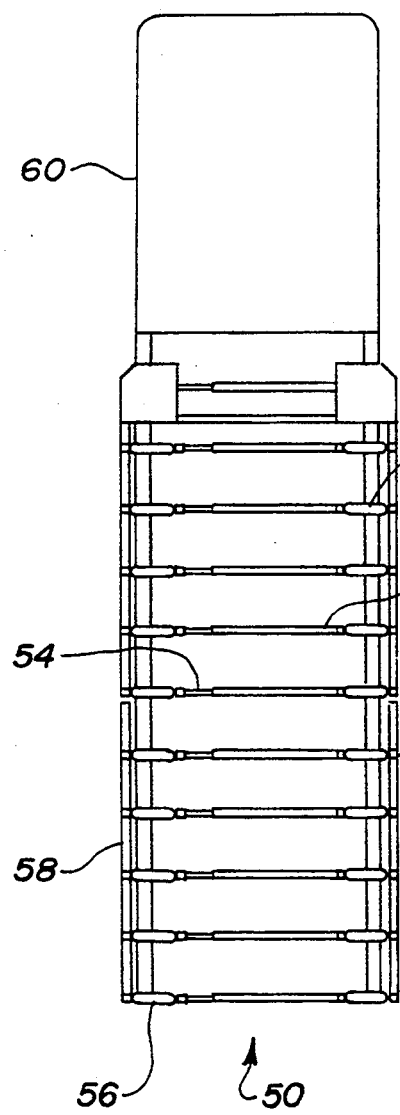
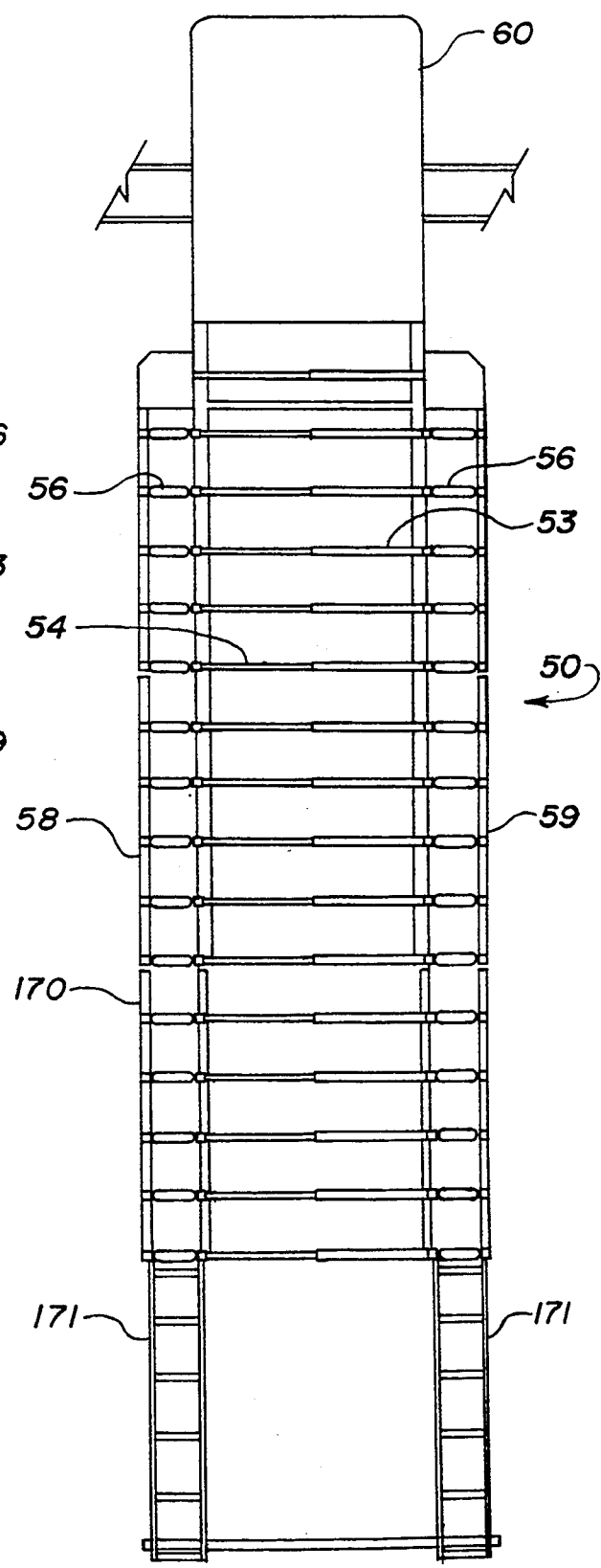

FIG. 9
FIG. 10
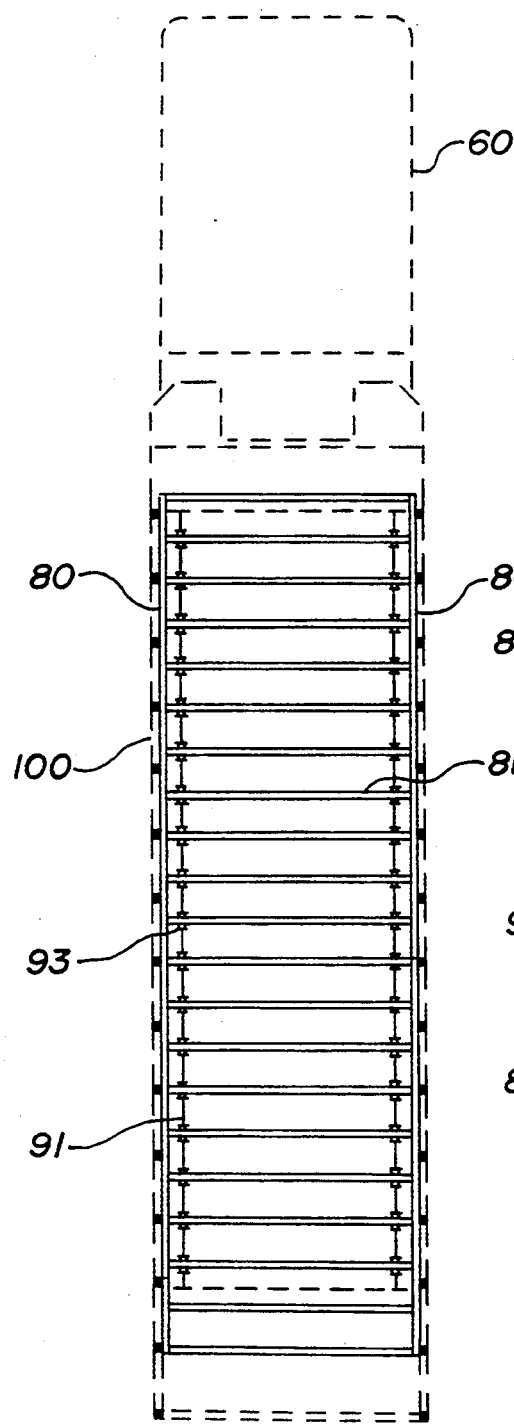
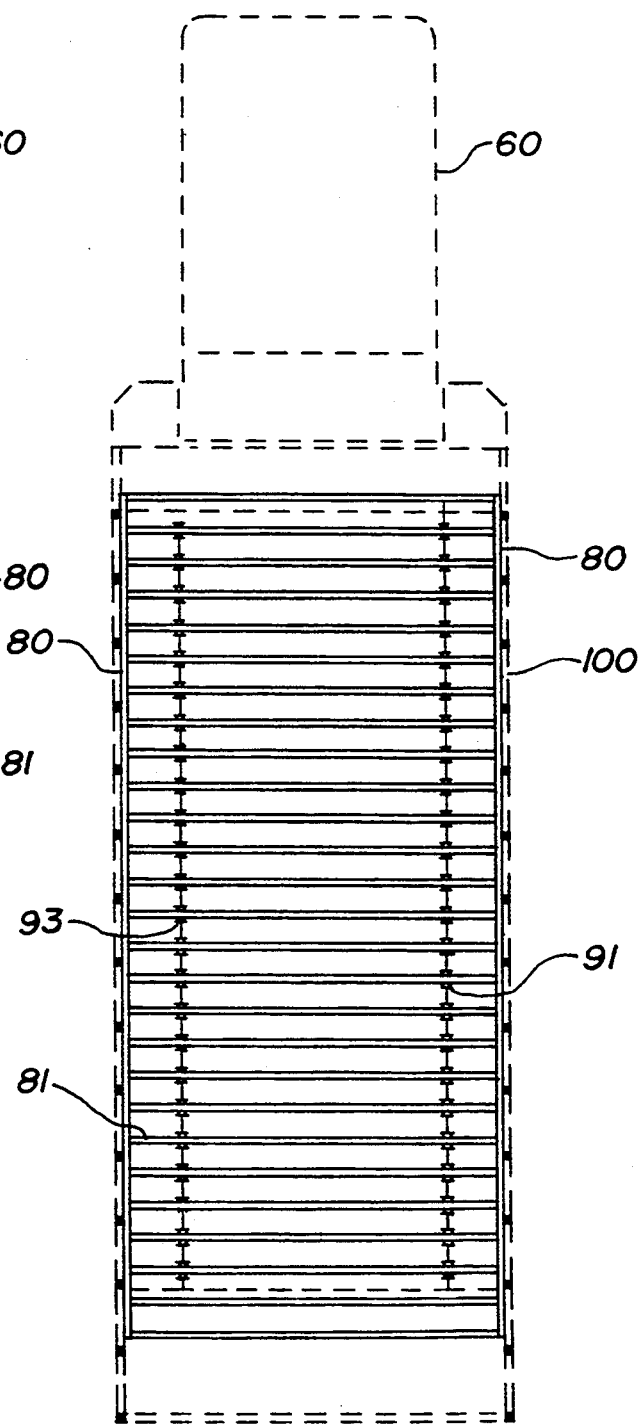

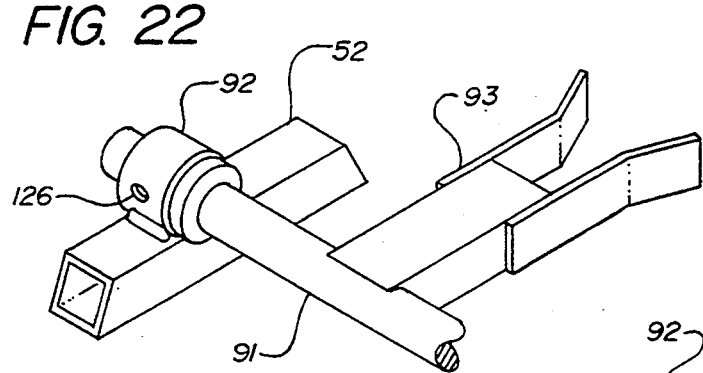
FIG. 22
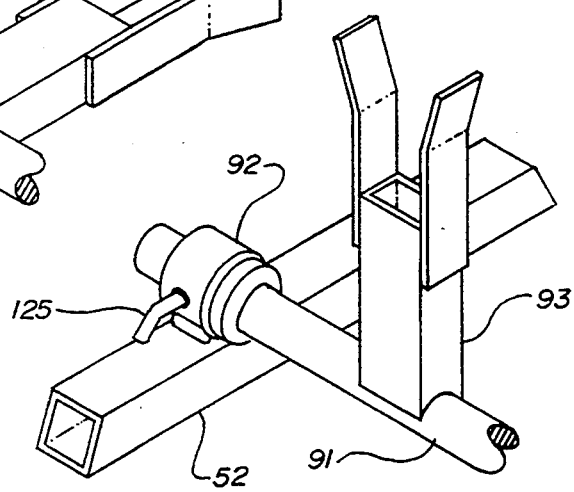
FIG. 23
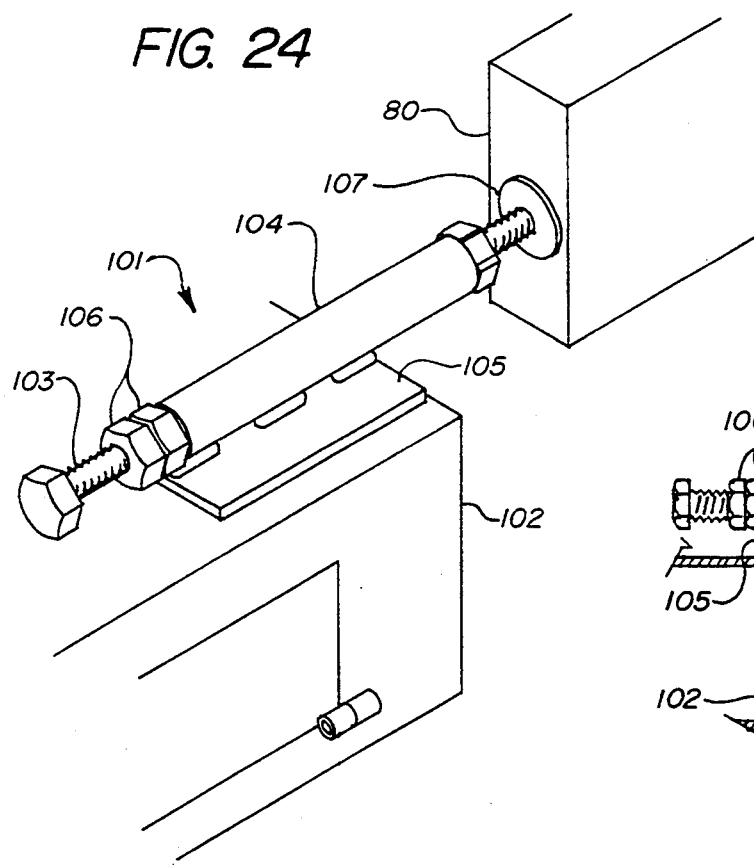
FIG. 24
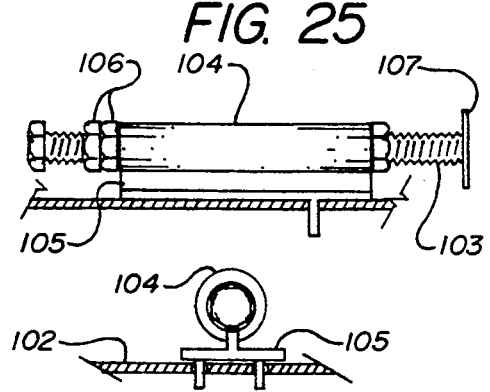
FIG. 25
FIG. 26

FIG. 32
FIG. 34
FIG. 33
FIG. 35
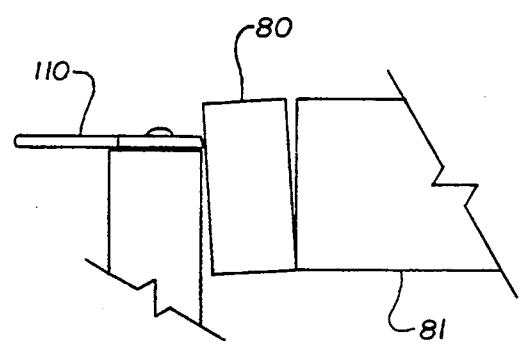
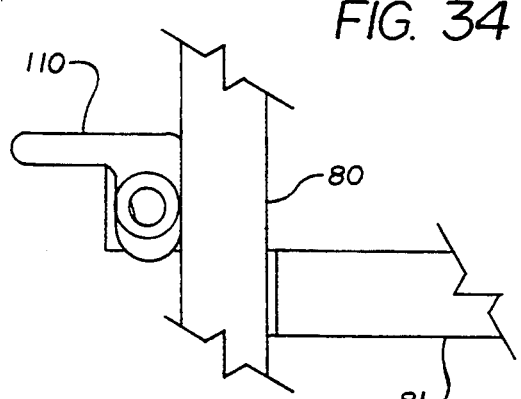
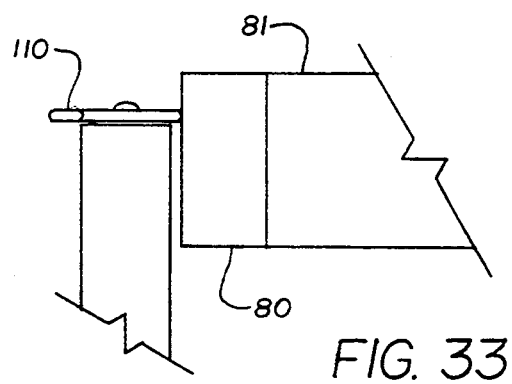
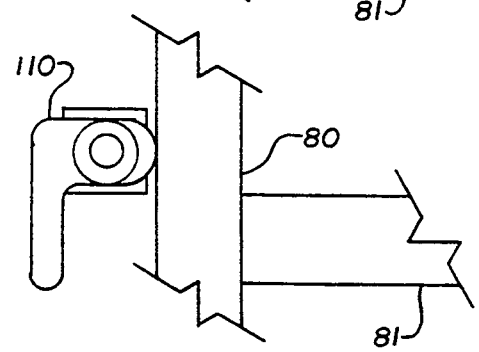
FIG. 36
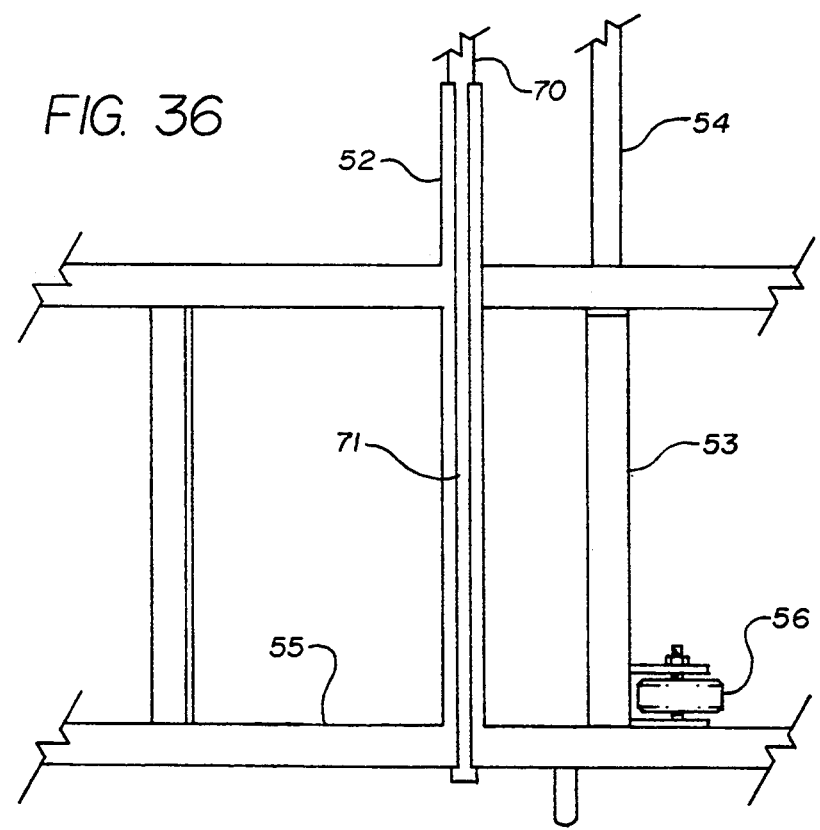

PORTABLE FRAMING JIG

This is a continuation-in-part of U.S. patent application Ser. No. 07/930,369, filed on Aug. 17, 1992, now abandoned.

BACKGROUND OF THE INVENTION

The present invention is directed to a framing jig for use in building construction and in particular to a portable framing jig which may be employed to frame various configurations of wall sections as well as roof trusses and similar structural components.

The wooden or metal frame construction of buildings requires the construction of various sub-assemblies such as wall sections and roof trusses. These structural sub-assemblies are typically constructed in place on the job site. Proper construction such that the sub-assemblies are properly dimensioned and square relies heavily on the skill of the individual craftsman. Non-uniformity in construction techniques is a feature of such manual construction. Furthermore such manual construction techniques are often time consuming.

One solution to these identified problems is prefabricated factory construction. While having many advantages of speed, economy and uniformity, factory prefabrication entails the transportation of bulky structural sub-assemblies from the factory to the job site, which is much less efficient than the transportation of lumber or steel.

It is known in the art to employ framing tables or jigs as construction aids in the prefabrication of wall sections, trusses and similar components. A jig typically includes a supporting surface or frame bed to support the various components of, for example, a wall section. There is then provided means for holding the various components in proper alignment for fastening together into the completed wall section. More specifically, a wall section would typically include a top plate or header in parallel relationship to a sill plate or bottom plate. A number of spaced parallel studs are placed between the top plate and the bottom plate. The studs are then nailed or otherwise fastened to the top plate and bottom plate to form the basic wall section. The basic wall section may be supplemented by additional components to form window and door openings. The jig also provides means for squaring up the components prior to assembly. Using a jig typically allows a wall section to be completed in less time, more accurately, and with fewer workers. Another advantage is that assembly can be conducted at a fixed height above ground which greatly eases the assembly process.

An example of such a jig is disclosed in U.S. Pat. No. 4,801,130 issued to Montgomery on Jan. 31, 1989 for "Framing Table Assembly." Montgomery discloses a framing table having longitudinally extending benches for horizontally supporting the top and bottom plates. Each bench is equipped with an array of flippers that may be pivotally positioned between a ready station and an active station. The spacing between the flippers at the active station may be narrowed to securely hold studs in position between the top and bottom plates.

It is also known in the art to provide portable jigs for use at construction sites. Such portable jigs provide many of the advantages of factory built construction while avoiding the complication of transportation of finished structural sub-assemblies from the factory to the job site. An example of a portable jig is disclosed in U.S. Pat. No. 4,629,171 issued to Judy, et al. on Dec. 16, 1986 for "Portable Jig for Assembling Prefabricated Building Structures." Judy discloses a jig for assembling a prefabricated building wall or similar structure. The jig includes a supporting frame and clamping members for forcing the top and bottom plates into engagement with the ends of the studs to assist in fastening the components together.

A problem not heretofore recognized in the use of jigs to assist in the construction of wood or metal frame sub-assemblies is that modern framing techniques have advanced beyond the traditional practice in which walls are constructed using a standard stud spacing and relatively simple arrangement of studs. For example, a builder may be required to alternate from a stud spacing of 24 inches on center to one of 16 inches on center, or even to 12 inches on center. Other spacings are, of course, possible although less common. In addition, the advent of energy efficiency concerns has led to the development of new framing arrangements such as staggered stud double walls. In this technique the wall thickness is no longer determined by the width of the typical 2×4 or 2×6 stud. Instead, the top and bottom plates become 2×6s or 2×8s or 2×12s or other suitable dimension. The studs are typically placed on 12 inch centers, however, the studs alternate between being placed toward the outer wall or toward the inner wall. The studs then present the appearance of defining two walls, one set of studs being on 24 inch centers toward the outer portion of the wall and the other set of studs staggered into the intervals between the first set of studs and positioned toward the inner wall, likewise on 24 inch centers. With this construction technique it is possible to place a great deal more insulation into the wall. This also allows the wiring to be sandwiched between the insulation with no holes drilled through the studing which eliminates air leakage at receptacle boxes. There is the additional advantage that there is no thermal bridging across the width of the wall since no single stud spans the entire width of the wall. While there are considerable advantages to the use of the staggered stud double wall, the construction of the staggered stud double wall is considerably more difficult than the construction of a traditional wall. While a traditional wall may be placed on a horizontal surface for assembly, the construction of a double wall requires some means for holding the alternating studs above the assembly surface. Manual framing therefore would require more persons to assist in the framing process with a great loss of economy.

In addition to the problems set forth above, the use of portable jigs at job sites implies that for maximum efficiency relative to the construction of wall sections or trusses at the factory, the portable jig must, to a considerable extent, carry the tools, equipment and materials available at the factory to the job site. There is thus a need to provide for a complete integrated system to maximize the efficiency of fabrication of structural sub-assemblies at the job site.

SUMMARY OF THE INVENTION

With the aforementioned problems in view, the present invention provides for a portable framing jig comprising a framing table which may be mounted on a trailer for easy transportation to a job site. The trailer provides storage space for the tools and components necessary to carry out fabrication of structural sub-assemblies at the job site, for example pneumatic nailers.

In addition, an air compressor and an array of air hose motorized reels are provided. In order to facilitate the construction process, a radial arm saw station with roller conveyor wing table extensions provided for the assembly line type cutting of lumber to size.

The framing table itself has a pair of longitudinal roller carriages for ease in moving the finished structural sub-assembly off the framing table. The framing table provides a plurality of cradles for receiving and holding each stud member in appropriate alignment for attachment to the top and bottom plates which rest on the roller carriages. A pair of teamed or ganged cradle assemblies is provided for each type of wall section. For example, with no adjustment needed, one pair of ganged cradle assemblies may be set at 16 inch centers. Another pair of ganged cradle assemblies may be set at 24 or 12 inch centers. The ganged cradle assemblies are pivotal so that a set may be raised into position to begin the framing process and upon completion of the framing process may be pivoted downward so as to clear the completed wall frame which may then be rolled off the framing table.

The present invention further provides for a pair of ganged cradle assemblies in which alternating cradles are adjustable so as to provide for the proper support of alternating studs for the construction of a staggered stud double wall of varying thicknesses.

In addition, the present invention is provided with a plurality of transverse members which may be used in conjunction with a plurality of simple jig stops movable on the transverse members such that varying configurations of roof, floor or other types of trusses may be easily assembled.

Other features and advantages of the present invention will be more clearly understood by reference to the following detailed description of the preferred embodiment in conjunction with the appended claims and the accompanying drawings.

BRIEF DESCRIPTION OF THE DRAWINGS

FIG. 2 includes the structural components of the gooseneck trailer and omits all of the framing table components.

FIG. 7 is an overhead plan view of the gooseneck trailer and framing tabale in a stowed configuration for transportation.

FIG. 8 is an overhead plan view of the gooseneck trailer and framing table as deployed in one configuration for the job site. The roller carriages are extended to either side. A framing table extension has been deployed and supplemental roller conveyor assemblies have been added to the rear of the framing table extension. The supplemental roller conveyor assemblies can be multiplied to extend the production assembly to any desired length.

FIG. 9 is a partial overhead plan view showing the assembly of top and bottom plates to a plurality of spaced studs to form a wall frame when the framing table is in the collapsed position.

FIG. 10 is an overhead plan view showing the assembly of a wall frame when the framing table is in its extended position.

FIG. 22 is a partial isometric view of a cradle assembly in the stowed position. The cradle assembly shaft rotates within a bearing collar.

FIG. 23 is a partial isometric view of a cradle assembly in the deployed position, where it is locked into position by the insertion of a locking pin through a hole in the bearing collar.

FIG. 24 is a partial isometric view of the squaring stop assembly whereby the position of the top or bottom plate is adjusted so that the wall frame is appropriately squared.

FIG. 25 is a side elevation of the squaring stop assembly.

FIG. 26 is an end view of the squaring stop assembly.

FIGS. 32 and 33 are elevation views and FIGS. 34 and 35 are plan views showing the action of the cam-action clamp bringing a warped plate into abutting engagement with the top of a stud.

FIG. 36 is a partial plan view of the bottom of the framing table showing the telescoping structural members allowing for expansion of the framing table.

DETAILED DESCRIPTION OF THE PREFERRED EMBODIMENT

The framing jig of the present invention may be used either in a stationary configuration as would be true for a factory oriented assembly operation or in a portable configuration for employment at a job site, which would be the preferred embodiment. The components of the present invention that would typically be employed in a stationary embodiment will be described first. Following that, the additional components that would typically be employed in a portable embodiment will be described.

Figure 1:
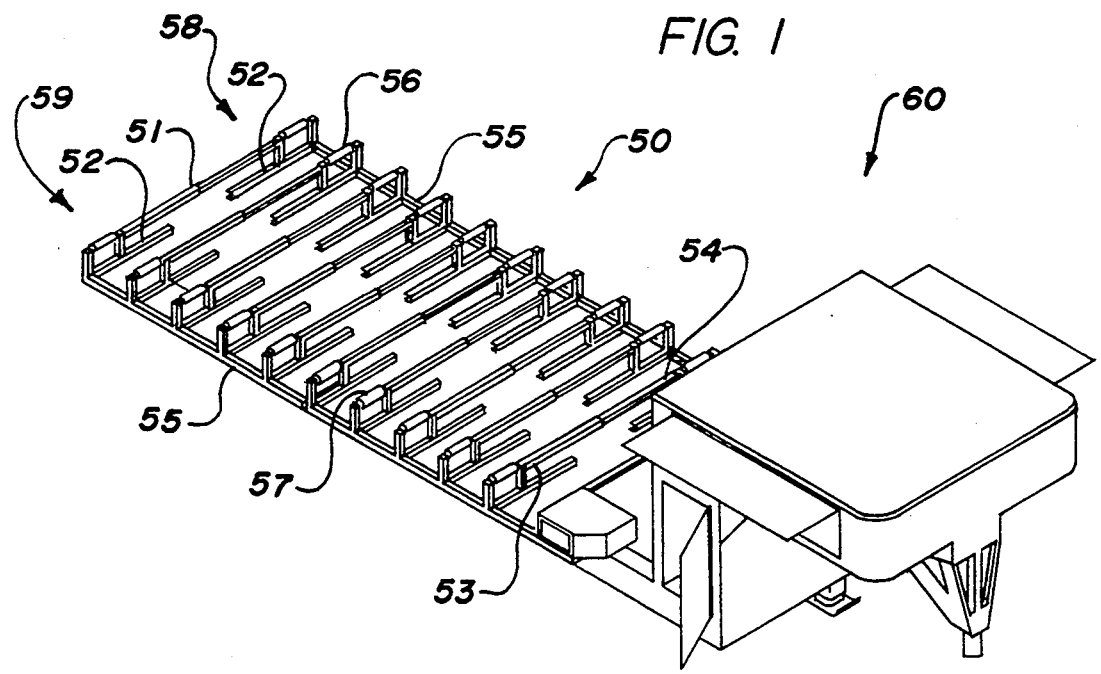
FIG. 1 is a partial isometric view of the framing table as mounted to a gooseneck trailer. For clarity, the structural components of the trailer and the cradle assemblies are omitted.
Figure 2:
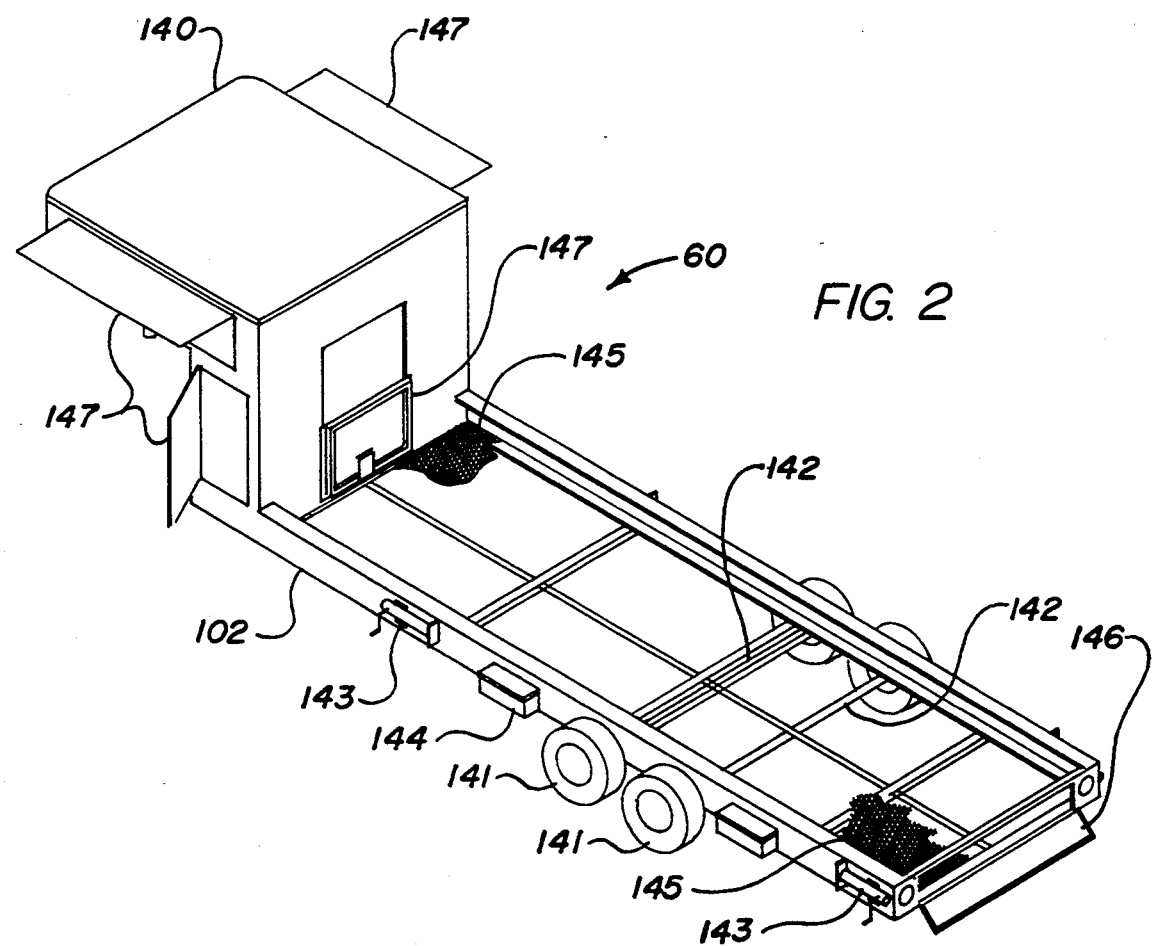
FIG. 2 is a partial isometric view of the gooseneck trailer of FIG. 1 shown from the opposite viewpoint.

With reference to FIGS. 1 and 2, the portion of the present invention which would be employed in either a stationary or a portable configuration is a framing table 50 and associated components as will be hereinafter described. For a portable configuration, the framing table 50 is mounted to a gooseneck trailer 60 which comprises various additional components to achieve the preferred portable embodiment. Both the framing table 50 and the gooseneck trailer 60 as shown in FIG. 1 have certain components omitted for clarity.

The basic structural components of the framing table 50 include upper transverse structural members 51 and lower transverse structural members 52. In the preferred embodiment, the upper transverse structural members 51 comprise an outer member 53 and an inner telescoping member 54 slidably received within the outer member 53. Further, in the preferred embodiment, the lower transverse structural members 52 are transversely slidable as will be described more fully hereinafter. By providing the telescoping action of the upper transverse structural member 51 and the sliding action of the lower transverse structural members 52, the entire framing table 50 may be expanded transversely. As will be described hereinafter, this transverse expansion of the framing table 50 accommodates various wall heights. In an alternative embodiment, the upper transverse structural members may comprise a single non-telescoping member and the lower transverse structural members may be fixed if transverse expansion of the framing table 50 to accommodate various wall heights is not required.

The upper transverse structural members 51 and the lower transverse structural members 52 are connected structurally to a pair of longitudinal structural members 55. A plurality of left rollers 56 and a plurality of right rollers 57 are mounted for rolling motion about transverse axes. The left rollers 56 and the right rollers 57 are rigidly mounted to their respective longitudinal structural members 55 and transverse structural members 51, 52 so as to form two rigid structural entities; i.e., the left roller carriage 58 and the right roller carriage 59 which are mutually independently slidable with respect to the other.

Figure 11:
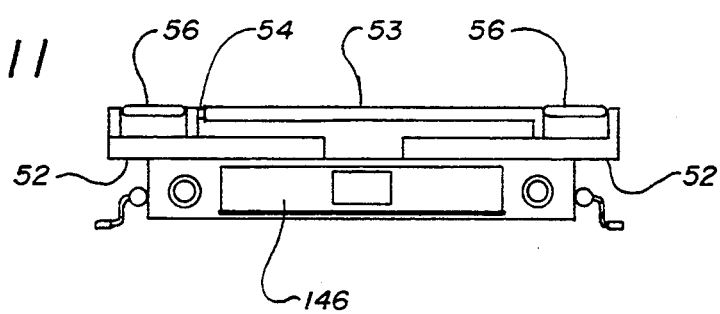
FIG. 11 is a partial rear elevation view of the gooseneck trailer structural assembly with the framing table in place showing the framing table in its collapsed position.
Figure 12:
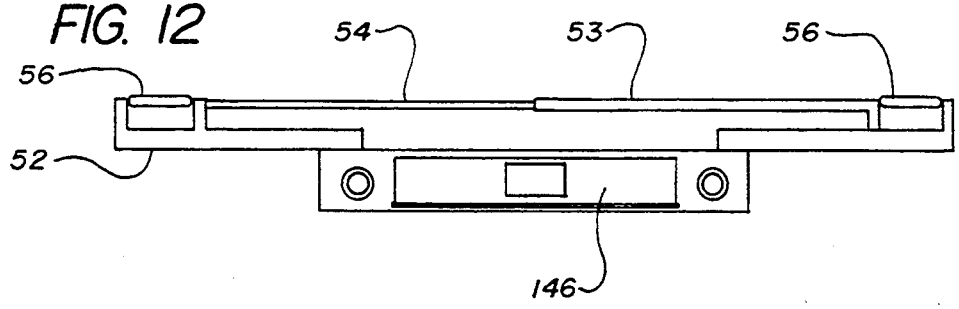
FIG. 12 is a partial rear elevation view of the gooseneck trailer structural assembly with the framing table in place showing the framing table in its expanded position.

With reference to FIGS. 7 and 8, it may be seen that movement of the left roller carriage 58 and the right roller carriage 59 relative to the gooseneck trailer 60 allows for the expansion of the framing table 50 to accommodate various wall heights. Likewise, FIGS. 11 and 12 show the expandability of the framing table 50 from a rear elevation perspective.

Figure 31:
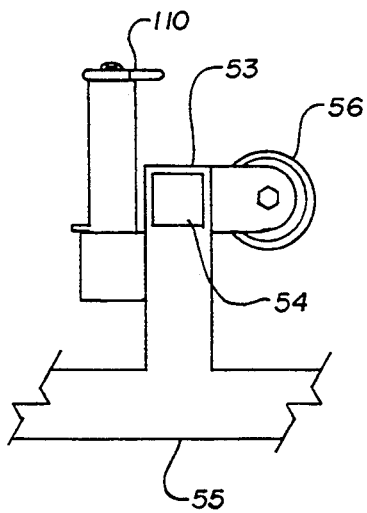
FIG. 31 is a partial side elevation view of a roller and cam-action clamp.

With reference to FIGS. 31, 36, 37, 38, 39, 40, 41 and 42, an alternative embodiment is described whereby the roller carriages 58, 59 may assume a collapsed or narrowed configuration suitable for constructing walls of very low height; for example, knee walls of approximately 4 feet in height or for similar purposes. First, with reference to FIG. 36 it may be noted that either of the described embodiments embody transverse sliding structural members 52. In either embodiment a complementary transverse member 70 may be fixed to the gooseneck trailer 60 so as to provide a fixed support and guide for the transverse sliding structural member 52 to slide along. For this alternative embodiment, a roller 56 is also provided although the roller 56 must be mounted in an offset manner for the reasons that will be hereinafter described. The manner in which the roller 56 is offset from the transverse telescoping structural members 53, 54 is illustrated in FIG. 31. The inner transverse telescoping member 54 is thus able to slide through the outer transverse telescoping member 53 without obstruction. Similarly as shown in FIG. 36, the transverse sliding member 52 is provided with a slot 71 along the full length of its underside so that the fixed transverse member 70 may be affixed to the gooseneck trailer 60 by means which do not interfere with the free sliding of the transverse member 52 with respect to the fixed member 70.

Figure 37:
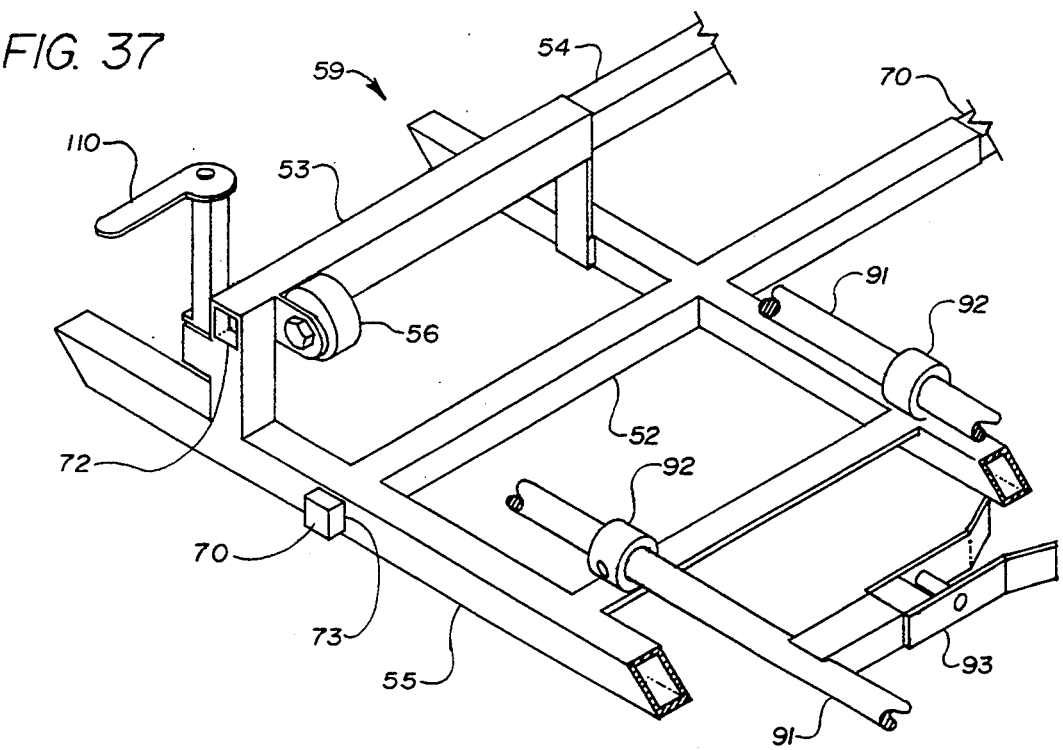
FIG. 37 is a partial isometric view of the framing table showing telescoping structural members.
Figure 38:
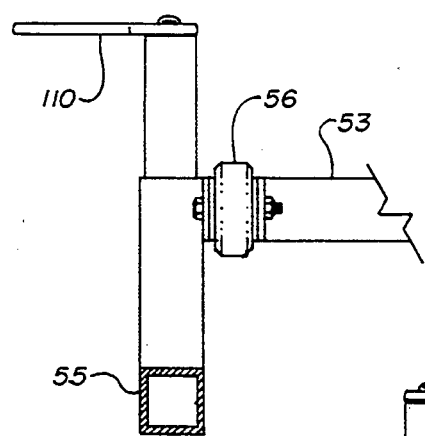
FIGS. 38 and 39 are partial back and front elevation views of a roller and cam-action clamp.
Figure 39:
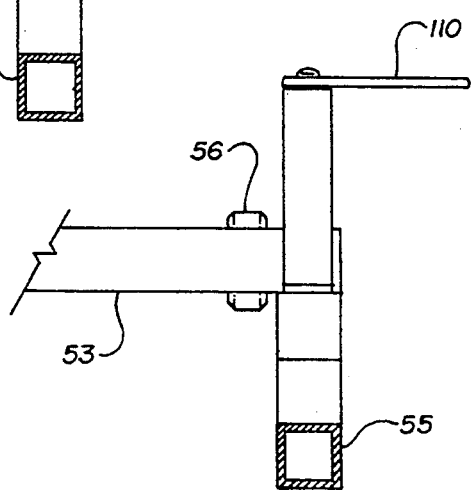
Figure 40:
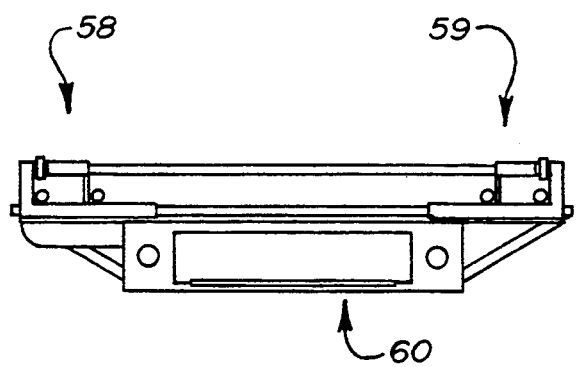
FIGS. 40, 41 and 42 are rear elevation views of the framing table showing the framing table in various expanded and collapsed positions.
Figure 41:
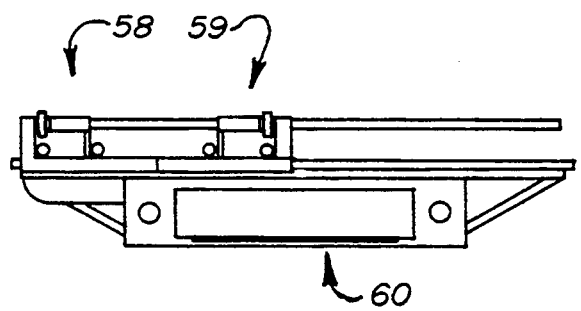
Figure 42:
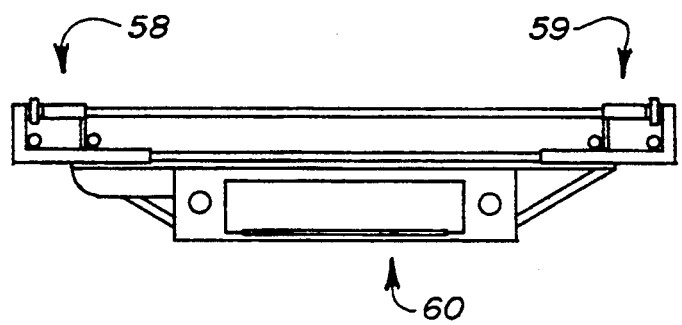

All of these features may be more clearly seen by reference to FIG. 37, which illustrates a portion of the right roller carriage 59. Relative to the fixed transverse member 70 and the inner telescoping member 54 the roller carriage 59 may be slid transversely so that the inner telescoping member 54 passes through the outer telescoping member 53 and protrudes through an opening 72 in the end of the outer telescoping member 53. Also, the fixed member 70 is able to slide through the transverse sliding member 52 and protrude through an opening 73 in the longitudinal member 55.

Figure 15:
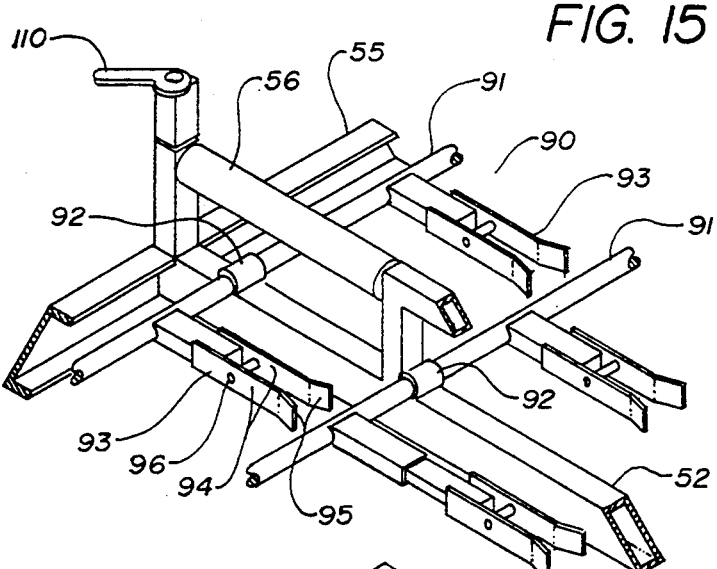
FIG. 15 is a partial isometric view of the framing table showing a roller, a cam-action clamp, a partial outer cradle assembly and a partial inner cradle assembly. Both cradle assemblies are shown in their stowed position.
Figure 16:
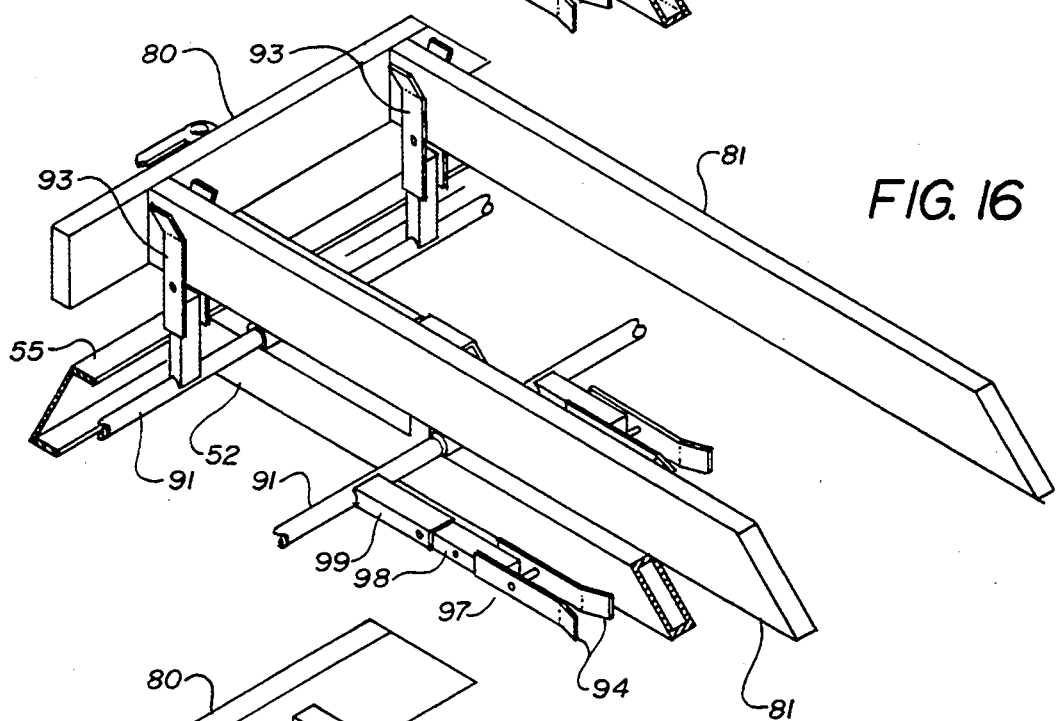
FIG. 16 is a partial isometric view of the framing table showing the outer cradle assembly in deployed position and a plate engagingly abutting the ends of two studs.
Figure 17:
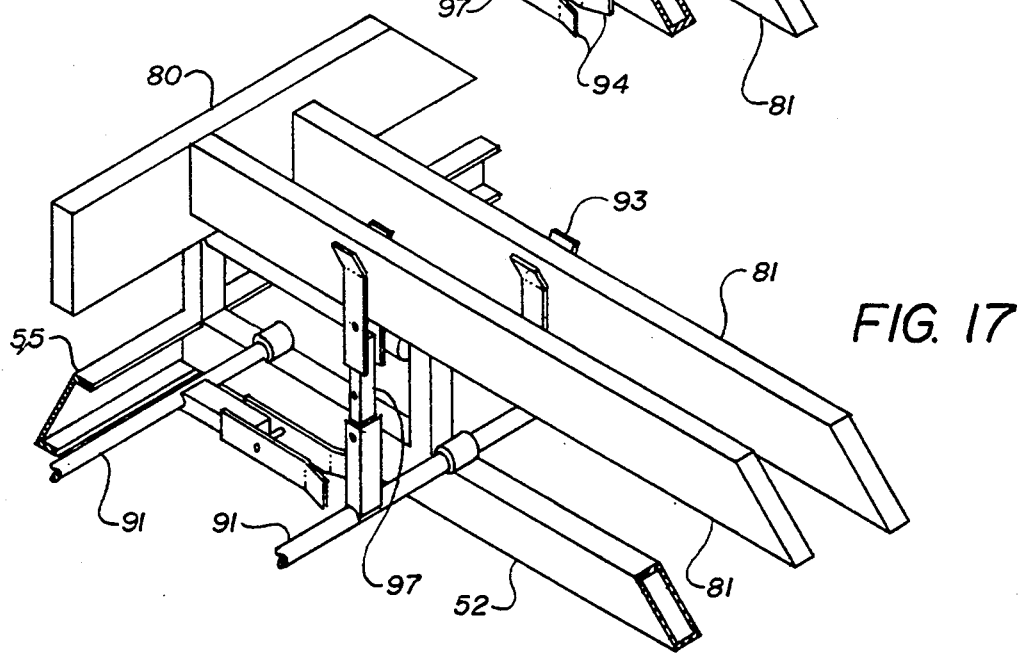
FIG. 17 is a partial isometric view of the framing table with the inner cradle assembly deployed. The inner cradle assembly is shown with an extensible cradle deployed for the fabrication of a staggered stud double wall.

By the means described above, the left roller carriage 58 and the right roller carriage 59 may be slid transversely both inwardly and outwardly with respect to the gooseneck trailer 60. As a result the height of the wall which may be framed on the framing table 50 may be adjusted so that either very short walls or very tall walls may be framed. The height of the wall that may be framed is defined by the relative transverse spacing between the rollers 56 of the left roller carriage 58 and the rollers 57 of the right roller carriage 59. Once the relative position of the two roller carriages 58, 59 have been adjusted for the appropriate wall height, framing begins by placing a plate 80, which may be either a top plate or a bottom plate, on one of the two roller carriages 58, 59 such that the plate 80 is positioned longitudinally and on its edge. Another plate 80 is then likewise positioned on the other roller carriage. Next a plurality of studs 81 are positioned transversely between the two plates 80 as shown in FIGS. 15 through 17. With particular reference to FIG. 15, the positioning of the studs 81 is accomplished by the use of one or more ganged cradle assemblies 90 positioned longitudinally along each side of the framing table 50. Each ganged cradle assembly 90 comprises a shaft 91 oriented longitudinally along the framing table 50 for pivoting motion about a longitudinal axis. The shafts 90 are pivotally mounted in bearing collars 92 which are rigidly affixed to the transverse sliding members 52. Each ganged cradle assembly 90 is provided with a plurality of cradles 93. The cradles 93 are rigidly affixed to the shaft 91 at regular intervals. The regular intervals between the cradles 93 may be fixed at any of a number of common dimensions employed in framing for the spaces between studs. For example, a common spacing would be 16 inches on center. It would be appropriate then for one set of ganged cradle assemblies 90 to possess cradles 93 positioned at 16 inch intervals. Furthermore, while in the preferred embodiment, the cradles 93 are rigidly affixed to the shaft 91, an alternative embodiment could provide for cradles 93 which may be disattached from and repositioned along the shaft 91 to achieve a different spacing, such as 12 or 24 inch centers.

Each cradle 93 is provided with a pair of parallel arms 94 which together define a space just wide enough to receive a standard 2×4 stud. In order to allow for each insertion of a stud 81 into the cradle 93 between the arms 94, each of the arms 94 is provided with a flared outer portion 95 to guide the stud 81 into the space defined by the arms 94. In addition, each cradle 93 is provided with a guide pin 96 which assures that each stud 81 is positioned at the appropriate location to abuttingly engage with the plate 80.

While a framing table 50 could be provided with only one set of ganged cradle assemblies 90, such an arrangement would greatly limit the flexibility of the builder in working with various framing schemes. As noted above, it is common for residential building frames to be constructed on 16 inch centers. A common alternative is to construct on 12 or 24 inch centers. While as noted above, the ganged cradle assemblies 90 could be constructed with movable cradles 93, the constant readjustment of spacing between the cradles 93 would be time consuming. To solve this problem one alternative embodiment of the present invention provides for two sets of ganged cradle assemblies 90. One set of ganged cradle assemblies 90 is provided with cradles 93 set at a spacing of 16 inches. The other set of ganged cradle assemblies 90 is provided with cradles 93 set at a spacing of 12 inches. By employing a spacing of 12 inches, it is possible to frame stud walls having either 12 or 24 inch centers or some multiple thereof. Other arrangements involving more than one set of ganged cradle assemblies is contemplated within the scope of the present invention.

In FIG. 15 two sets of ganged cradle assemblies 90 are shown in a stowed position, i.e., the shafts 91 are rotated so that the cradles 93 all lie in an essentially horizontal orientation. As shown in FIG. 16, one set of ganged cradle assemblies 90 is rotated so that the cradles 93 are in a substantially vertical orientation. Studs 81 are then laid into complementary sets of cradles 93 so as to abuttingly engage the top and bottom plates 80. The top and bottom plates 80 are then fastened to the studs 81 after which the ganged cradle assemblies 90 are lowered to their stowed position allowing a completed frame composed of top and bottom plates 80 and a plurality of studs 81 to be rolled off the framing table 50 along the rollers 56, 57.

With reference to FIGS. 9 and 10, a completed frame 100 is shown in position on the framing table 50 as set for a relatively short wall height in FIG. 9 and as set for a relatively tall wall height in FIG. 10.

In similar fashion by lowering the set of ganged cradle assemblies 90 which are set at 16 inch centers and raising the set of ganged cradle assemblies 90 which are set at 12 or 24 inch centers, a wall section framed with studs at 12 or 24 inch centers may be achieved.

In addition to the simple wall framing systems which employ studs arrayed in a single plane, an alternative framing arrangement known as the staggered stud double wall frame may be accomplished with an alternative embodiment of the present invention. As shown in FIGS. 16 and 17, an extensible cradle 97 may be provided by mounting cradle arms 94 to a telescoping extension arm 98 which is slidably mounted within a fixed extension arm 99. The telescoping extension arm 98 may be fixed relative to the fixed extension arm 99 at a number of positions. By alternating extensible cradles 97 with non-extensible cradles 93, alternating studs 81 will be positioned at varying heights, depending on the degree of extension of the extensible cradle 97 as shown in FIG. 17. Depending on the degree of extension of the extensible cradle 97, varying widths of plates 80 may be required. Rather than the standard 4 inch width in a standard type of stud frame construction, the plates 80 may be 6 inch, 8 inch, 10 inch, 12 inch or some other width as appropriate.

A wall constructed by this method differs from a standard stud wall not only in its thickness but in the pattern of staggered studs wherein alternate studs are located relatively near one side of the wall while intervening studs are located near the opposite side of the wall. As a result, such a wall can accommodate greater amounts of insulation and thermal bridging through the thickness of the wall is reduced. Therefore, through the provision of multiple sets of ganged cradle assemblies 90, at least one set of which is provided with extensible cradles 97, a great variety of wall sections may be framed quickly and easily.

Various features are provided to ensure that the wall frame produced on the present invention is appropriately squared and rigidly fastened without twisting or warping. With reference to FIG. 24, an adjustable stop 101 is affixed to the roller carriage assemblies 58, 59 or to the bed 102 of the gooseneck trailer 60. Additionally with reference to FIGS. 25 and 26 it may be seen that the stop assembly 101 comprises a bolt 103 threadedly received within a tube 104 rigidly affixed to a base 105 which in turn is rigidly affixed in a longitudinal orientation to the bed 102 of the gooseneck trailer 60. The bolt 103 may be adjusted longitudinally and locked into position by locknuts 106. A stop 107 affixed to an end of the bolt 103 provides a reference point for positioning the plates 80 such that the entire frame 100 is appropriately squared. After making an initial adjustment of the stop assembly 101 subsequent frames 100 may be assembled in rapid succession without further adjustment.

It is often true that a plate 80 will be warped so that it does not naturally fit into tight abutting engagement with the studs 81. The effect of such warping is shown in FIGS. 32 and 34. In order to correct this problem, the present invention is provided with a plurality of cam-action clamps 110 disposed outboard of the rollers 56 such that rotation of the cam-action clamp 110 in a horizontal plane forces warped or misaligned plates 80 into tight abutting engagement with the studs 81 as shown in FIGS. 33 and 35.

Figure 21:
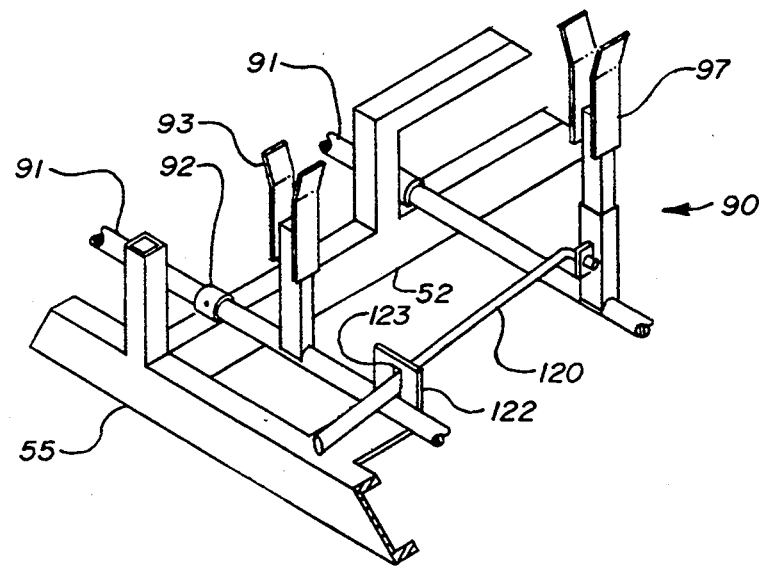
FIG. 21 is a partial isometric view of the framing table showing an offset arm for manually moving a cradle assembly between the stowed and deployed positions.
Figure 27:
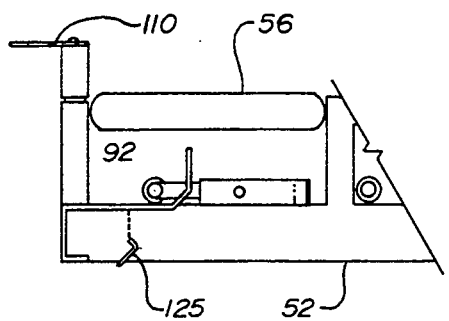
FIGS. 27 and 28 are partial end elevation views of an outer cradle assembly showing the cradle assembly in its stowed position and in its locked deployed position respectively.
Figure 29:
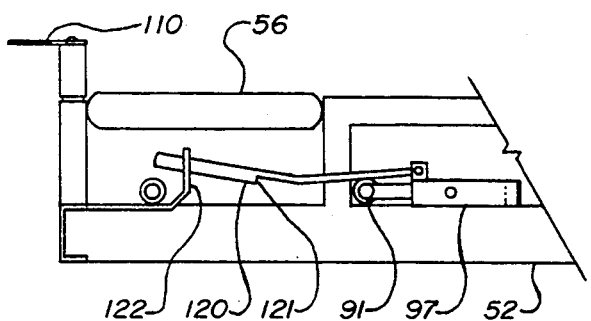
FIGS. 29 and 30 are partial end elevation views of an inner cradle assembly in its stowed and locked deployed positions respectively.
Figure 28:
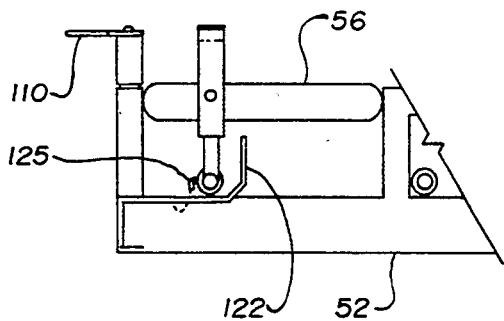
Figure 30:
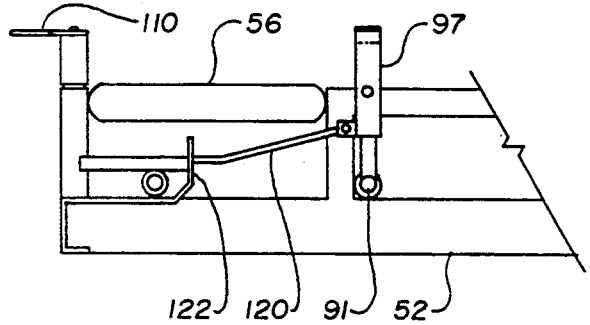

The pivoting of the ganged cradle assemblies 90 between a stowed position as exemplified by FIG. 15 and active positions as exemplified by FIGS. 16 and 17 may be accomplished by various means. For example, the ganged cradle assemblies may be rotated by mechanical means such as electric motors or by pneumatic or hydraulic means; for example, air cylinders operating through offset lever arms affixed to the shafts 91. An embodiment employing manual means is exemplified by FIG. 21. A handle 120 may be pivotally attached to a cradle 93, 97 at a point offset from the axis of rotation of the shaft 91. Manual motion of the handle 120 in a transverse direction therefore acts to move the cradle between an upright vertical active position and a horizontal stowed position as shown in FIGS. 29 and 30. Such an arrangement is most likely to be necessary when more than one set of ganged cradle assemblies 90 is employed. Necessarily some ganged cradle assemblies 90 must be located inboard of others, which renders such a handle arrangement desirable so that one may manually position the inboard ganged cradle assemblies from a position outboard of the framing bed 50. It may also be desirable that the handle 120 be provided with a locking arrangement so that the ganged cradle assemblies 90 are not disturbed when in the active deployed position. In one embodiment the handle 120 is provided with an offset notch 121 as shown in FIG. 29. A plate 122 is provided with a slot 123 through which the handle 120 passes. By engaging the offset notch 121 against the slot 123, the ganged cradle assembly 90 is effectively locked into position. Lifting the handle 120 frees the offset notch 121 from the slot 123 allowing the ganged cradle assembly 90 to be returned to the stowed position.

When a single ganged cradle assembly 90 or a ganged cradle assembly 90 positioned outboard of all other ganged cradle assemblies is being positioned, no such elaborate arrangements are needed. The ganged cradle assembly 90 may be easily reached and manually rotated into position or manually stowed. To lock the ganged cradle assembly 90 into position, a locking pin 125 may be inserted through a hole 126 in the bearing collar 92 into a complementary hole on the shaft 91.

Figure 43:
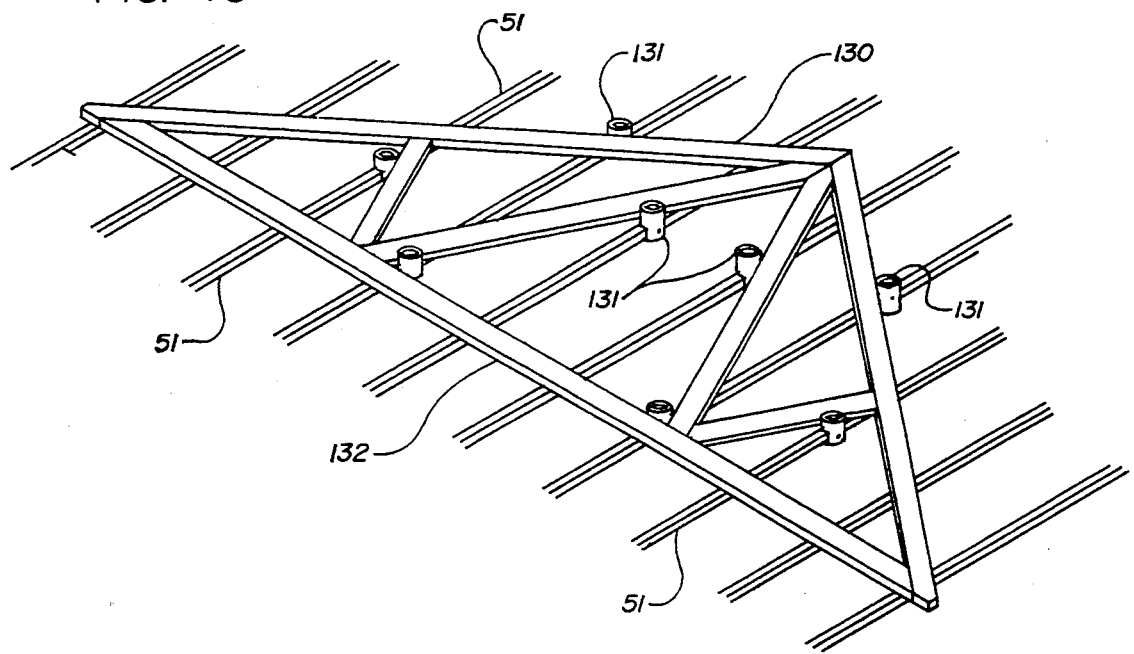
FIG. 43 is a partial isometric view of a roof truss laid out on the transverse structural members of the framing table.
Figure 44:
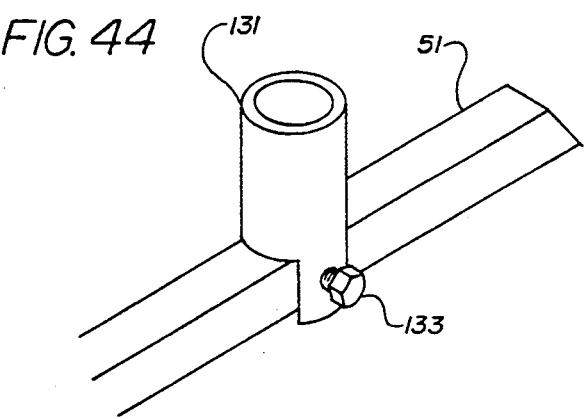
FIG. 44 is an isometric view of a jig stop positioned on a transverse structural member.
Figure 45:
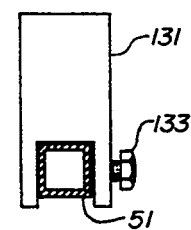
FIG. 45 is an elevation view of a jig stop.
Figure 46:
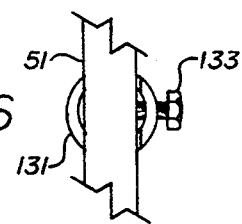
FIG. 46 is a bottom plan view of a jig stop.

The framing bed 50 of the present invention may also be used to assemble trusses 130 as shown in FIG. 43. The transverse telescoping structural members 51 provide the base upon which the elements of the truss 130 are laid out. A jig stop 131 may be positioned upon the transverse telescoping member 51 as shown in FIG. 44. A plurality of jig stops 131 are placed on the transverse telescoping structural members 51 such that the elements of the roof truss 130 are positioned for fastening. The chord 132 of the roof truss would normally be positioned so that the cam-action clamps 110 bear against the chord 132 to force all of the elements of the roof truss 130 into tight abutting engagement. After fastening, the roof truss 130 is removed from the framing bed 50 and either the jig stops 131 may be repositioned or the jig stops 131 may be left into position to allow a number of duplicate trusses 130 to be fabricated. With reference to FIGS. 45 and 46, the jig stop 131 is cylindrical in shape to ensure that it is always tangent to any point of the roof truss 130 on which it bears. The jig stop 131 is slotted to fit over the transverse telescoping structural members 51. A set screw 133 is threadedly received through the jig stop 131 such that it bears upon the transverse telescoping structural member 51. Tightening of the set screw 133 fixes the jig stop 131 into position on the transverse telescoping structural member 51. Expansion of the framing bed 50 by extending the roller carriages 58, 59 allows the versatility to accomodate large trusses.

The framing bed 50 comprises the left and right roller carriages 58, 59 and one or more sets of ganged cradle assemblies 90, along with associated components such as the cam-action lever 110 and the stop assembly 101. While the framing bed 50 may be used in a stationary configuration, its greatest utility is found in a portable configuration. For use in a portable configuration, the framing bed 50 is mounted on a gooseneck trailer 60 in the orientation shown in FIG. 1. The gooseneck trailer 60 comprises a bed 102 and an equipment storage subassembly 140 as shown in FIG. 2. The bed 102 is the main structural element of the gooseneck trailer 60. The wheels 141 and axles 142 are mounted to the bed 102 along with jacks 143 for leveling the bed 102 of the gooseneck trailer 60 at the job site. The bed 102 may also be provided with one or more storage boxes 144, for example, for storing nails. The bed 102 is also provided with a floor 145 of expanded metal mesh so that workmen may walk across the bed 102 during a framing operation. In addition, the floor 145 acts to catch tools or equipment accidentally dropped during the framing operation. The bed 102 is also provided with a hatch 146 at the rear which allows access to a storage space between the expanded metal mesh floor 145 and the framing bed 50 so that various long components, supplies and equipment may be stored therein. The equipment storage subassembly contains a number of doors 147 for access to storage compartments therein.

Figure 3:
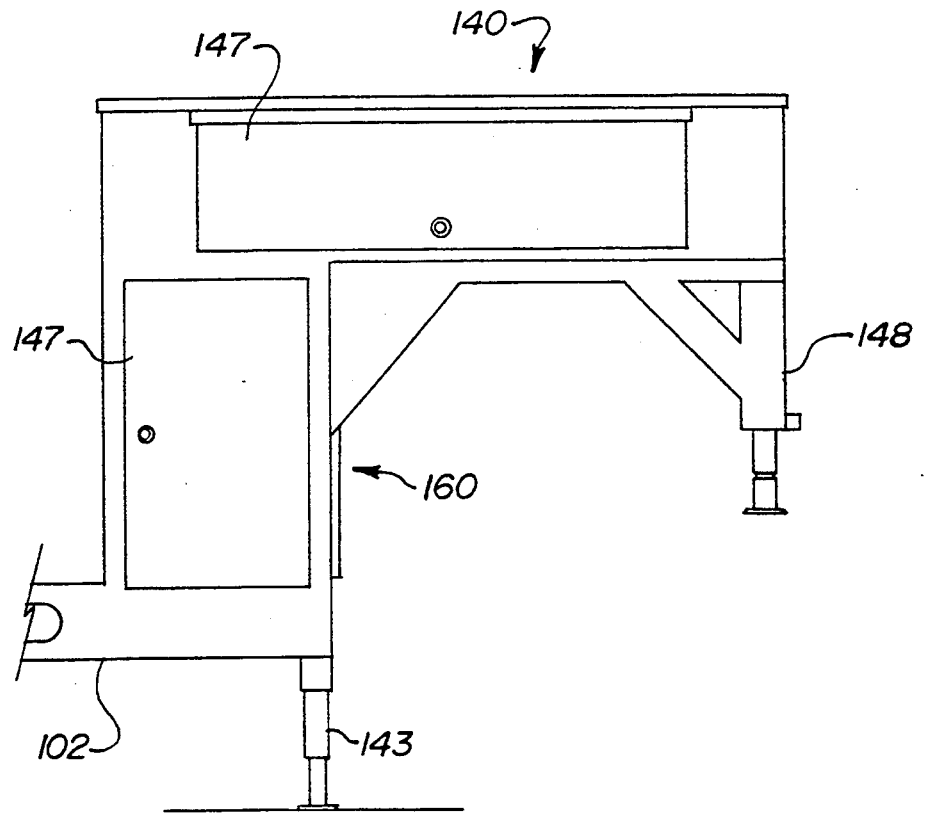
FIG. 3 is a partial right side elevation of the gooseneck trailer showing only the tool storage and equipment sub-assembly.
Figure 4:
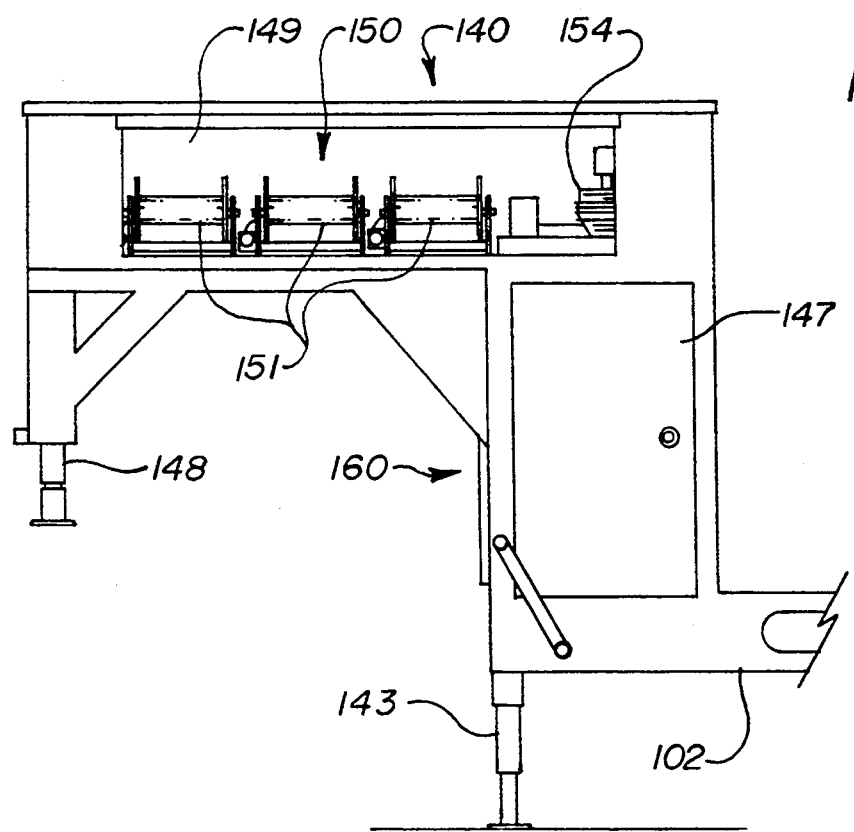
FIG. 4 is a partial left side elevation of the gooseneck trailer showing only the tool storage and equipment sub-assembly. The upper storage compartment is open showing a portion of the air compressor and three air hose motorized reels.
Figure 6:
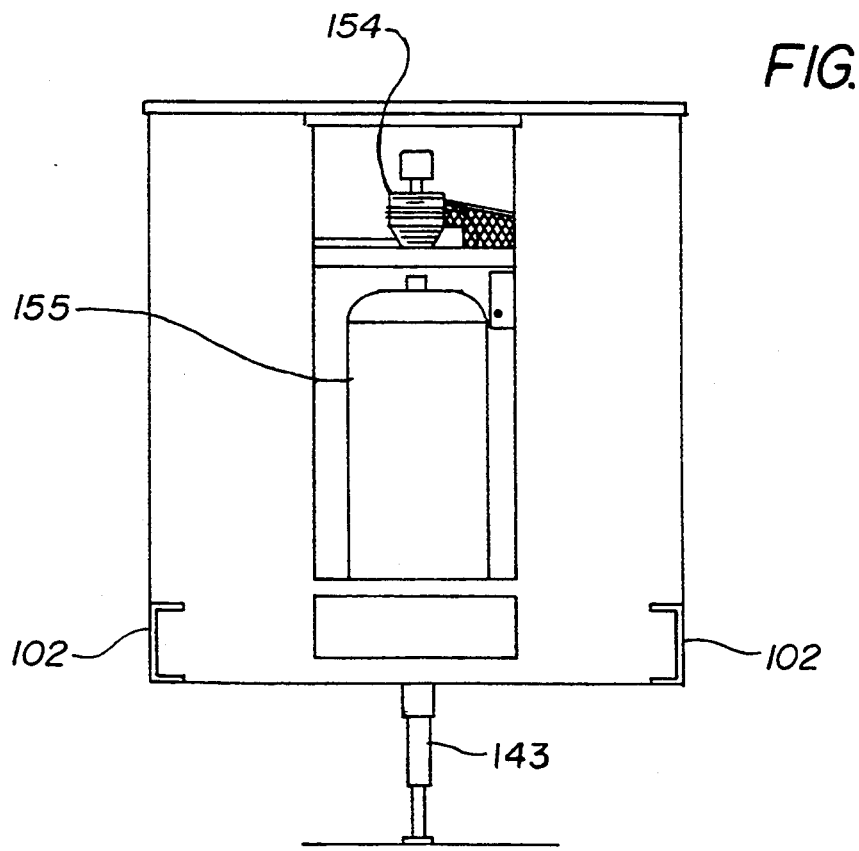
FIG. 6 is a rear elevation of the tool storage and equipment sub-assembly of the gooseneck trailer. The gooseneck trailer structural assembly is omitted for clarity. The air compressor and air storage tank as disposed within the tool storage and equipment sub-assembly is shown.
Figure 19:
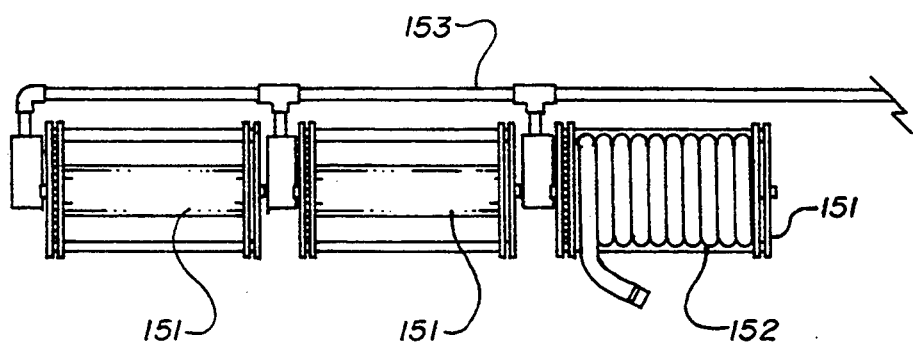
FIG. 19 is a plan view of the air hose reel assembly.

With reference to FIGS. 3 and 4 it may be seen that the equipment storage subassembly also includes the gooseneck hitch 148. Located within the equipment storage subassembly 140, an upper storage compartment 149 houses an air hose reel assembly 150 comprising a plurality of air hose motorized reels 151. With reference to FIG. 19, each air hose reel 151 is provided with an air hose 152. The air hose reels are connected by piping 153 which in turn is operatively connected to an air compressor 154 and storage tank 155 as shown in FIGS. 4 and 6. The air hose reels may be operatively connected to pneumatic nailers. An array of air and electrical outlets are located along the sides of the framing bed 50.

Figure 5:
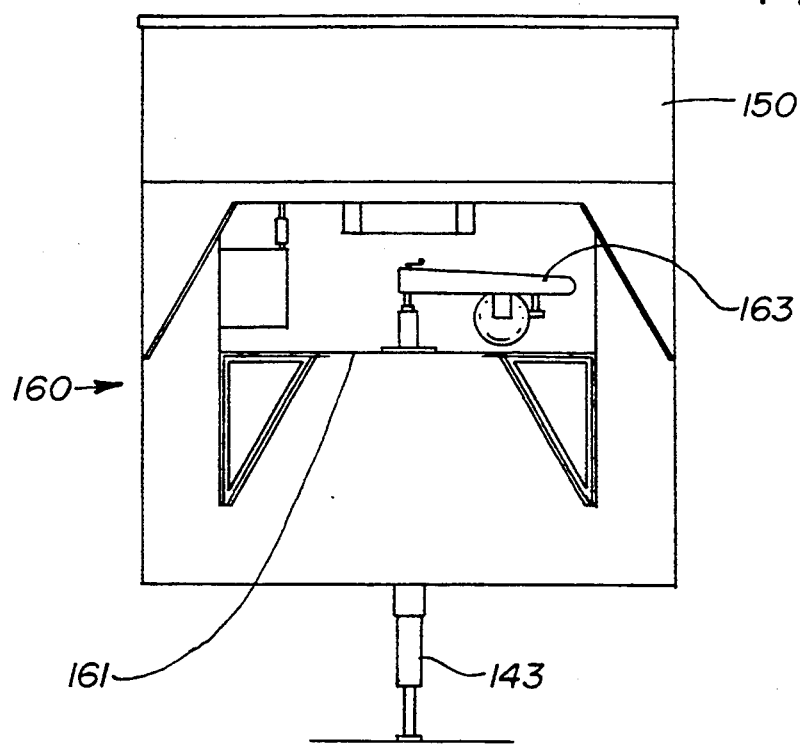
FIG. 5 is a front elevation of the tool storage and equipment sub-assembly of the gooseneck trailer. The hitch is removed for clarity. The radial arm saw as stowed for transportation is shown.
Figure 18:
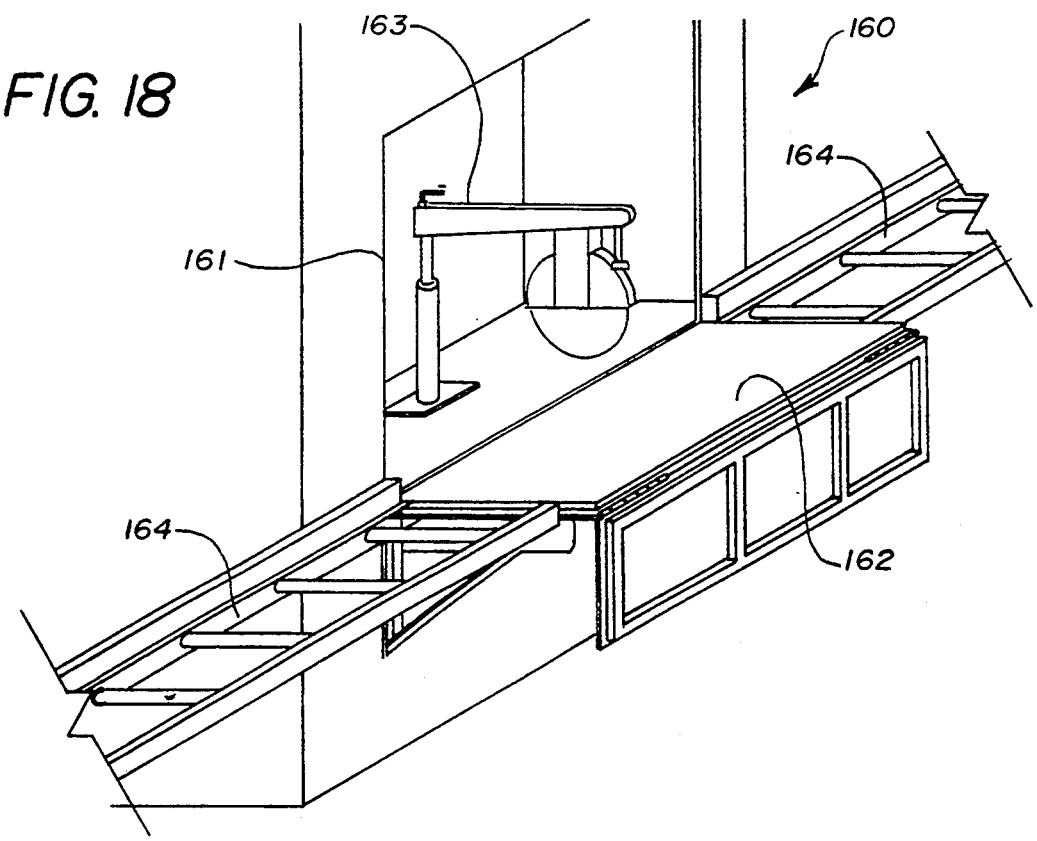
FIG. 18 is a partial perspective view of the radial arm saw deployed with saw table roller conveyor wing extensions.

As shown in FIGS. 5 and 18, a lower storage compartment 160 is disposed between the upper storage compartment 140 and the bed 102. A portion of the lower storage compartment, accessible from the under side of the upper storage compartment 150 rearward of the gooseneck hitch 148, is deployed as a sawing station 161. The sawing station 161 comprises a door 162, supported by two swing out arms, which folds down to expose a radial arm saw 163 and which serves as a sawing table. Wing extensions 164 may be mounted to either side of the door 162 when disposed as a table for the radial arm saw 163. The wing extensions 164 allow for the safe support of long lengths of lumber. Using the sawing station 161, lumber may be cut to size at the job site so as to avoid the necessity for precutting lumber before transporting the lumber to the job site. In addition, the sawing station 161 is located in convenient proximity to the framing bed 50 so that the entire operation of cutting the lumber to length and assembling the cut lumber into a wall section or roof truss can be handled in an efficient and time conserving manner.

For greater flexibility the framing bed 50 of the present invention may be expanded for greater lengths of wall than might be possible within the constraints of the length of the bed 102 of the gooseneck trailer 60. With reference to FIG. 8 an extension 170 may be attached to the framing bed 50 so as to provide for the framing of extra long walls. In addition, supplemental roller assemblies 171 may be added to the framing bed 50 or framing bed extension 170 to assist in rolling off longer sections of wall.

Figure 20:
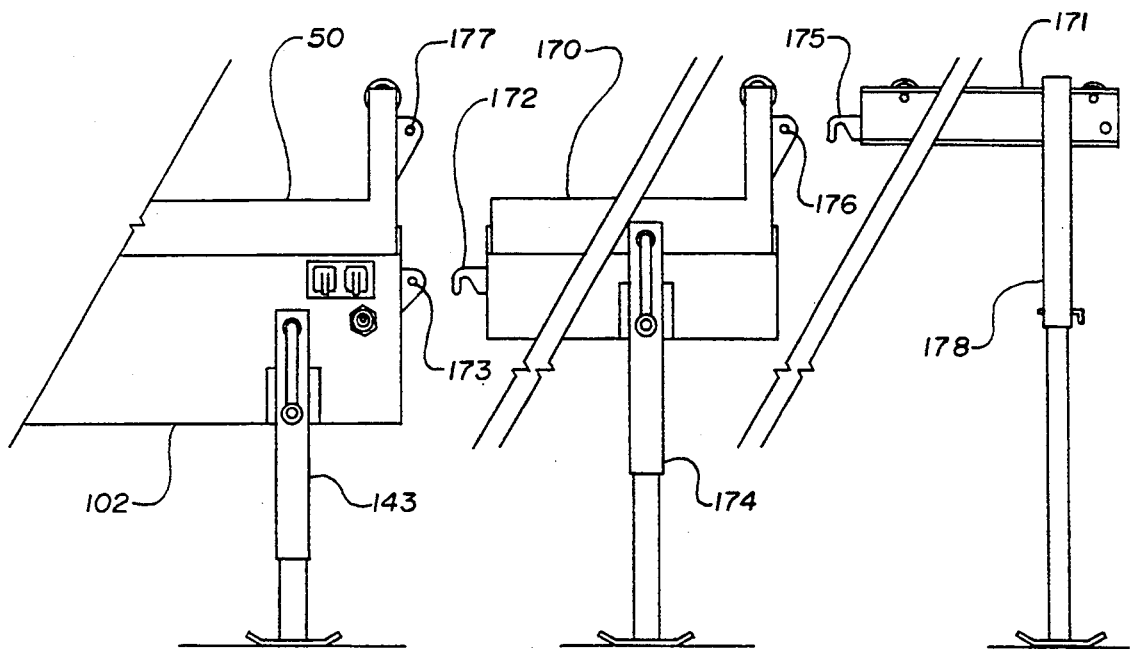
FIG. 20 is an exploded partial elevation view showing the attachment of the framing table extension to the framing table and the attachment of the supplemental roller assemblies to the framing table extension.

FIG. 20 illustrates the attachment of the framing bed extension 170 to the framing bed 50. Hooks 172 on the framing bed extension 170 attach to pins 173 on the framing bed 50. In addition, the framing bed extension 170 is provided with jacks 174 for leveling the framing bed extension 170 relative to the framing bed 50. Likewise, the supplemental roller assemblies 171 are provided with hooks 175 for attachments to pins 176 on the framing bed extension 170 or to pins 177 on the framing bed 50. In addition, the supplemental roller assemblies are provided with legs 178 which may be adjusted for leveling the supplemental roller assemblies 171.

Figure 13:
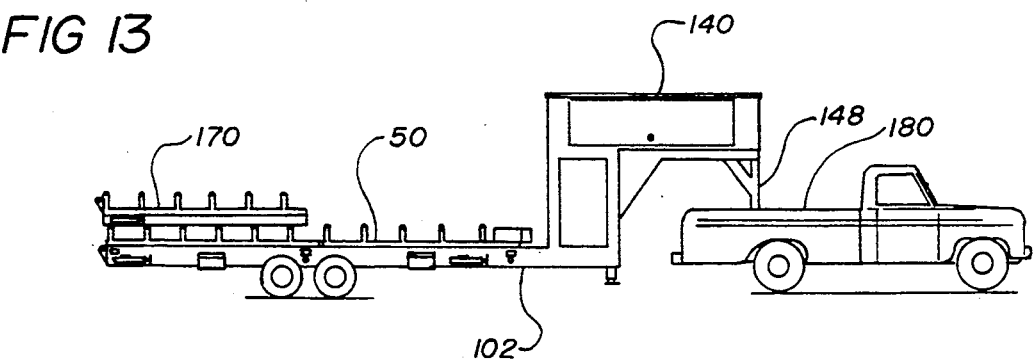
FIG. 13 is a right side elevation of the gooseneck trailer and framing table showing the framing table extension stowed for transportation.
Figure 14:
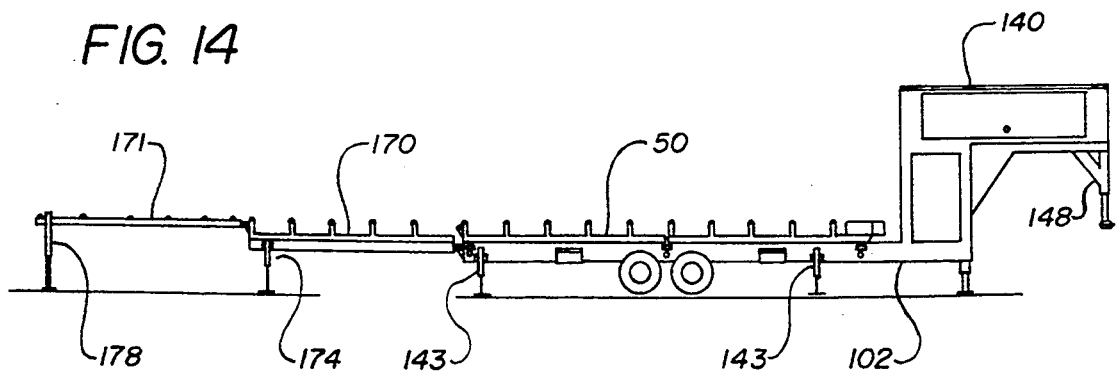
FIG. 14 is a right side elevation of the gooseneck trailer and framing table with the framing table extension deployed and supplemental roller assemblies added to the framing table extension.

FIG. 13 illustrates the present invention as configured for transportation by a transportation vehicle 180. The framing bed extension 170 is stowed on top of the framing bed 50. The supplemental roller assemblies 171 are stowed through the hatch 146 onto the expanded metal mesh floor 145. FIG. 14 shows the present invention fully deployed with the framing bed extension 170 and the supplemental roller assemblies 171 in position. The jacks 143, 174 and support legs 178 are fully deployed for leveling the bed 50, bed extension 170 and supplemental roller assemblies 171.

The present invention has been described with reference to certain preferred embodiments and alternative embodiments which are exemplary and not by way of limitation to the full scope of the present invention as set forth in the following claims.

What is claimed is:

1. A framing jig for assembling skeletal framework having longitudinal structural members, transverse structural members or other non-longitudinal and non-transverse structural members comprising:

(a) first and second parallel, longitudinally extending and transversely separated carriages;
   (b) two or more pairs of ganged cradle assemblies having first and second cradle assemblies pivotally mounted to said first and second carriages respectively for pivotal movement about a longitudinal axis between an active position and a stowed position, said ganged cradle assemblies having a plurality of cradles for receiving and supporting transverse structural members of the skeletal framework in a generally horizontal and spaced transverse configuration when deployed in said active position;
   (c) each of said pair of ganged cradle assemblies further having a characteristic spacing between adjacent cradles.

2. A framing jig for assembling skeletal frameworks having longitudinal structural members, transverse structural members or other non-longitudinal and non-transverse structural members, comprising:

(a) first and second parallel, longitudinally extending and transversely separated carriages;
   (b) at least one pair of ganged cradle assemblies having first and second cradle assemblies pivotally mounted to said first and second carriages respectively for pivotal movement about a longitudinal axis between an active position and a stowed position, said ganged cradle assemblies further having a plurality of cradles having a characteristic spacing between adjacent cradles;
   (c) at least each alternating ones of said cradles having means for transverse extension for receiving and supporting transverse structural members of the skeletal framework in a spaced transverse configuration in more than one horizontal plane when deployed in said active position.

3. The framing jig of claim 1 or claim 2 wherein each of said carriages further comprises a longitudinal roller assembly for supporting longitudinal structural members in proximity to the transverse structural members and for conveying the skeletal framework off the framing jig.

4. The framing jig of claim 3 further comprising means for urging the longitudinal structural members into abutting engagement with the transverse structural members.

5. The framing jig of claim 4 wherein said means for urging comprises a plurality of cam-action clamps affixed to said carriages.

6. The framing jig of claim 4 in combination with a trailer for transportation of the framing jig to a job site.

7. The framing jig of claim 6 having means for supplying pressurized air mounted on said trailer and a plurality of pneumatic nailers operatively coupled to said means for supplying pressurized air.

8. The framing jig of claim 7 wherein said trailer is a gooseneck trailer having means for storing tools and equipment.

9. The framing jig of claim 8 having a sawing station for preparing structural members to specified lengths.

10. The framing jig of claim 5 further comprising means for transverse expansion of said carriages.

11. The framing jig of claim 5 further comprising a plurality of transverse supports for supporting non-transverse and non-longitudinal structural members, and a plurality of jig stops movably affixed to said transverse supports for defining roof trusses.

* * * * *